United States Patent
Vaittinen et al.

(10) Patent No.: US 7,519,384 B2
(45) Date of Patent: Apr. 14, 2009

(54) ENHANCED ASSISTED CELL CHANGE

(75) Inventors: Rami Vaittinen, Littoinen (FI); Harri Jokinen, Pertteli (FI); Guillaume Sebire, Espoo (FI)

(73) Assignee: Nokia Corporation, Epsoo (FI)

( * ) Notice: Subject to any disclaimer, the term of this patent is extended or adjusted under 35 U.S.C. 154(b) by 175 days.

(21) Appl. No.: 11/206,005

(22) Filed: Aug. 17, 2005

(65) Prior Publication Data

US 2006/0058034 A1 Mar. 16, 2006

Related U.S. Application Data

(60) Provisional application No. 60/609,787, filed on Sep. 14, 2004.

(51) Int. Cl.
 *H04Q 7/00* (2006.01)
(52) U.S. Cl. .................. 455/522; 455/436; 455/524; 455/403; 370/332
(58) Field of Classification Search ......... 370/328–350; 455/432.1–453, 509–518, 67.11, 67.13, 115.3, 455/560
See application file for complete search history.

(56) References Cited

U.S. PATENT DOCUMENTS

| | | | |
|---|---|---|---|
| 6,032,047 A | 2/2000 | Cerwall et al. | 455/450 |
| 6,167,282 A | 12/2000 | Hunsberger | 455/513 |
| 6,188,904 B1 | 2/2001 | Marsan | |
| 6,434,389 B1 | 8/2002 | Meskanen et al. | 455/437 |
| 6,882,842 B2 | 4/2005 | Stephan et al. | 455/434 |
| 7,209,743 B2 | 4/2007 | Babovic | 455/436 |
| 2001/0011019 A1* | 8/2001 | Jokimies | 455/449 |
| 2003/0224790 A1 | 12/2003 | Choi | |
| 2004/0008657 A1* | 1/2004 | Lee et al. | 370/342 |

(Continued)

FOREIGN PATENT DOCUMENTS

EP 1 076 465 2/2001

(Continued)

OTHER PUBLICATIONS

"3rd Generation Partnership Project; Technical Specification Group Services and System Aspects; Multimedia Broadcast/Multicast Service; Stage 1" (Release 6), 3GPP TS 22.146 V6.5.0 (Jun. 2004).

(Continued)

*Primary Examiner*—Kamran Afshar
(74) *Attorney, Agent, or Firm*—Harrington & Smith, PC (57) ABSTRACT

A system and method for minimizing the gap in service during the reception of an MBMS session due to the reselection of a neighboring cell in which that MBMS session is not ongoing, wherein a mobile station (MS) indicates its target cell and MBMS service id (i.e., BSIC, neighboring cell index, and Temporary MBMS Group Identity (TMGI)) to a network by sending this information to the network in an RLC/MAC message, e.g., a packet downlink ACK/NACK or with a new message. If the network has resources available for allocation, the network is permitted to allocate these resources for the MBMS session indicated by the MS and send corresponding MBMS neighbor cell information to the MS upon receipt of the packet downlink ACK/NACK or the new message. When the MS receives the MBMS neighbor cell information, it will then reselect to the target cell identified by the MBMS neighbor cell information.

50 Claims, 3 Drawing Sheets

U.S. PATENT DOCUMENTS

| | | | |
|---|---|---|---|
| 2004/0147266 A1* | 7/2004 | Hwang et al. | 455/445 |
| 2004/0152480 A1 | 8/2004 | Willars et al. | |
| 2004/0202140 A1 | 10/2004 | Kim et al. | 370/335 |
| 2004/0248575 A1* | 12/2004 | Rajala et al. | 455/436 |
| 2005/0041608 A1 | 2/2005 | Jeong et al. | 370/310 |
| 2005/0042987 A1 | 2/2005 | Lee et al. | 455/67.11 |
| 2005/0079870 A1* | 4/2005 | Rick et al. | 455/437 |
| 2005/0232292 A1 | 10/2005 | Richards et al. | 370/432 |
| 2005/0282571 A1 | 12/2005 | Oprescu-Surcobe et al. | 455/503 |

FOREIGN PATENT DOCUMENTS

| | | |
|---|---|---|
| EP | 1 347 614 | 9/2003 |
| WO | WO 00/79808 | 12/2000 |

OTHER PUBLICATIONS

"Assisted Cell Change during MBMS p-t-m transmission", 3GPP TSG GERAN #21 Montreal, Canada, Aug. 23-27, 2004.

3rd Generation Partnership Project; Technical Specification Group GSM/EDGE; Radio Access Network; Radio subsystem link control (Release 6), 3GPP TS 45.008 V6.9.0 (Aug. 2004).

"Universal Mobile Telecommunications System (UMTS); Multimedia Broadcast/Multimedia Broadcast/Multicast Service (MBMS); Stage 1 (3GPP TS 22.146 version 5.2.0 Release 5) ETSI TS 122 146" Standards, European Telecommunications Standards Institute, Sophia-Antipo, FR, vol. 3-SA1, No. V520, Mar. 2002, XP014007342 ISSN:0000-0001 Paragraphs 4 and 5.

3GPP: 3rd Generation Partnership Project; Technical Specification Group Radio Access Network; Introduction of the Multimedia Broadcast Multicast Service (MBMS) in the Radio Access Network (Stage-2); (Release 6); 3GPP TS 25.346 V1.1.0 3GPP TS 25.346 V1.1.0, May 2002, pp. 1-11, XP002260225.

3GPP TS 44.060 V7.2.0 (Nov. 2005); 3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 7).

3GPP TS 44.018 V7.2.0 (Nov. 2005); 3rd Generation Partnership Project; Technical Specification Group GSM/EDGE Radio Access Network; Mobile radio interface layer 3 specification; Radio Resource Control (RRC) protocol; (Release 7).

3GPP TSG GERAN#21; Tdoc GP-042013; Montreal, Canada, Aug. 23-27, 2004; Agenda Items 6.6, 7.1.5.7, 7.2.5.4.2; Source; Siemens, Telecom Italia S.p.A., Vodafone; "Assisted Cell Change during MBMS p-t-m transmission", pp. 1-9.

3GPP TS 45.008 V6.9.0 (Aug. 2004); 3rd Generation Partnership Project; Technical Specification Group GSM/EDGE; Radio Access Network; Radio subsystem link control; (Release 6).

3GPP TS 22.146 V6.5.0 (Jun. 2004); 3rd Generation Partnership Project; Technical Specification Group Services and System Aspects; Multimedia Broadcast/Multicast Service; Stage 1; (Release 6).

* cited by examiner

ENHANCED ASSISTED CELL CHANGE

RELATED APPLICATIONS

This application claims priority from U.S. Provisional Application Ser. No. 60/609,787 filed Sep. 14, 2004.

BACKGROUND OF THE INVENTION

1. Field of the Invention

The invention is directed to a system and methods for transmitting/receiving data during Broadcast mode and Multicast mode and, more particularly, to a method for minimizing signalling loads due to mutual exchanges of information between neighboring cells in which a session is transmitted, and for reducing a time required to transmit MBMS neighbor cell information messages in a serving cell when a higher level of signalling occurs.

2. Detailed Description of the Related Art

MBMS (Multimedia Broadcast/Multicast Service) is a unidirectional Point-to-Multipoint (p-t-m) multicast/broadcast service in which data is transmitted from a single source entity to a group of users located in a specific area. MBMS may comprise a selection of unidirectional p-t-m bi-directional point-to-point (p-t-p) transmissions of multimedia data, such as text, audio, picture, or video, from a single source entity to a multiplicity of users in a service area. As stated in the 3rd Generation Partnership Project (3GPP) Technical Specification (TS) 22.146, "Multimedia Broadcast/Multicast Service; Stage 1", it is a goal of MBMS is to allow the provision of multiple instances of a p-t-p service with a single transmission over a radio interface as a radio multicast. "Service area" for a given MBMS service is hereafter to be understood as the geographical area (i.e. set of cells) where the service is made available.

MBMS has two modes, e.g., Broadcast mode and Multicast mode. The main difference between these two modes is that in Broadcast mode all MBMS users in the service area are targeted for receipt of transmitted data, whereas in Multicast mode it is possible to address only a subset of the MBMS users in the service area for receipt of the data. As defined in the 3GPP TS 22.146, "Multimedia Broadcast/Multicast Service; Stage 1," Multicast mode typically requires a user to subscribe to a multicast group before receiving the service.

Figure 1:
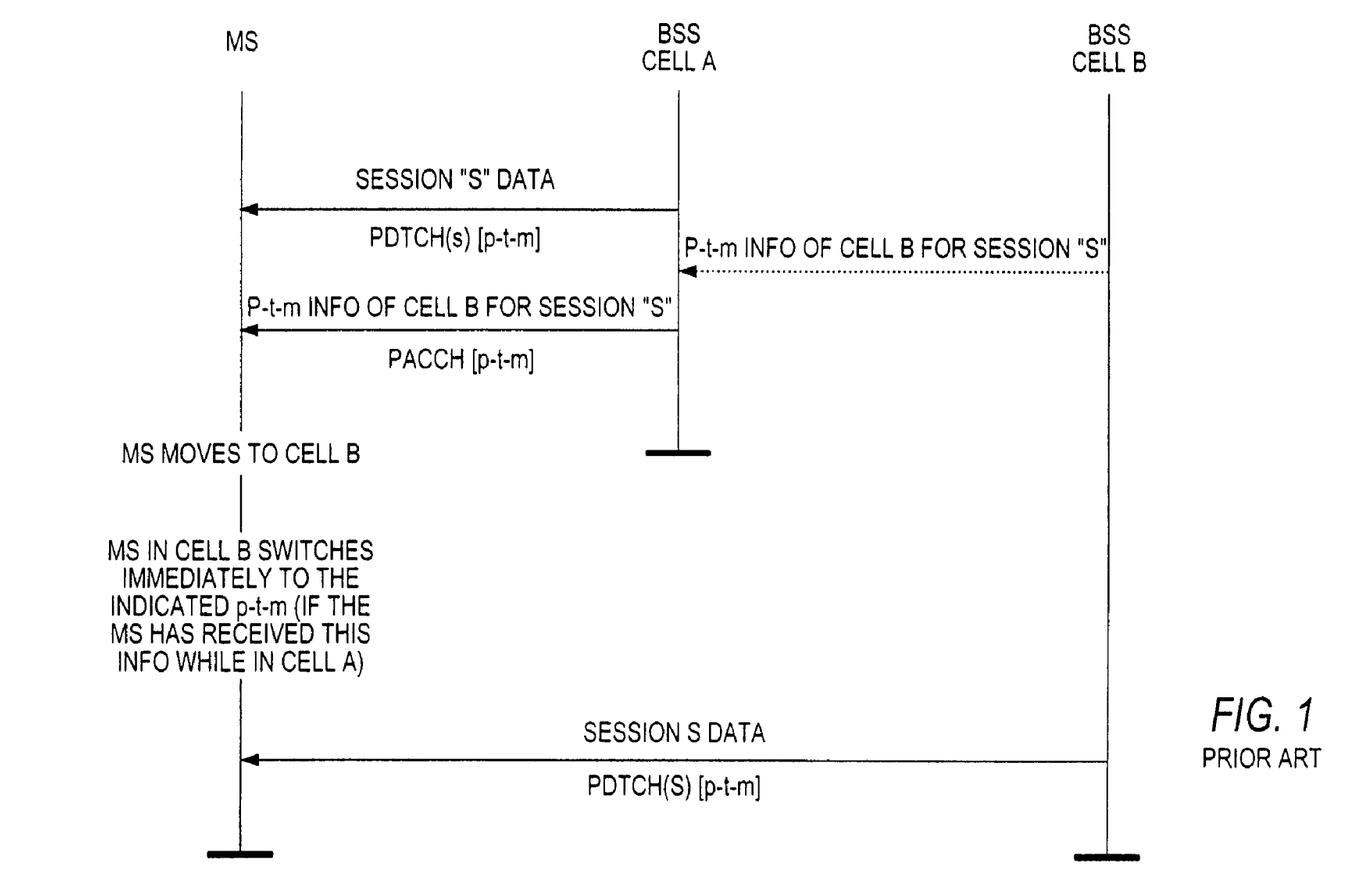
FIG. 1 is an exemplary flow diagram illustrating the reception of multimedia broadcast/multicast session (MBMS) data between neighboring cells for a given session.

In GP-042013 "Assisted Cell Change during MBMS p-t-m Transmission", Siemens, Telecom Italia S.p.A, Vodafone, 3GPP TSG GERAN#21 (Montreal, Canada), a solution is described for providing a source cell with the information about the MBMS bearer (p-t-m channel) in the neighboring cells for a given session. With reference to FIG. 1, it is optimal if a mobile station (MS) can resume reception of MBMS data in the target cell as soon as a new cell has been selected, during acquisition of Packet-Broadcast Control Channel (P-BCCH) information, or during a Routing Area Update procedure.

MBMS traffic channel configuration and MBMS service ID information is sent via an existing Radio Link Control/Medium Access Control (RLC/MAC) message, such as a conventional packet neighbor cell data (PNCD) message that is used to convey neighboring cell system information in a serving cell. Alternatively, the MBMS traffic channel configuration and MBMS service ID information is sent in a new message that is transmitted on a packet associated control channel (PACCH) that is associated with the MBMS traffic p-t-m channel. A new message is defined herein as MBMS neighbor cell information, whether it is a PNCD message or a new message.

MBMS neighbor cell information (Cell C, Session S) refers to an MBMS neighbor cell information message that contains at least: i) the parameters that permit identification of the neighboring cell C; (ii) the parameters of the MBMS bearer (p-t-m channel) on which the session S is transmitted in cell C; and/or (iii) an identifier of the session S. This information is transmitted for the following reasons: (i) as a way to provide the users with available information as soon as possible, subsequent to commencement of the MBMS data transfer in the serving cell; (ii) when the MBMS bearer (p-t-m channel) is reconfigured or an initiation of the new MBMS service in a specific neighboring cell has occurred. In this case, the base station controller (BSC) broadcasts the new bearer configuration on the packet associated control channel (PACCH) in the specific neighboring cell; (iii) when periodic repetitions of the information is required in order for mobile stations (MS) (e.g., mobile phones, PDA, etc.) entering the cell (e.g. late arrivals) to acquire the information; and (iv) when a repetition of the information is further required to account for possible errors on an air interface.

A main problem associated with the conventional method for receiving data during Broadcast mode and Multicast mode is the gap in service of the reception of an MBMS session at cell re-selection that occurs when a current MBMS session is inactive in the neighboring cell to which the MS will reselect. In fact, after the MS has reselected this cell it is required to request the establishment of this MBMS session in this cell. In addition, the network is required needs to establish this MBMS session in this cell. During the time that the MS is unable to acquire this MBMS session.

Accordingly, there is a need to minimize the gap in service that occurs when an MBMS session which the MS is receiving in the serving cell is not ongoing in the neighboring cell to which the MS will reselect.

SUMMARY OF THE INVENTION

The invention is directed to a system and method for minimizing the gap in service during the reception of an MBMS session due to the reselection of a neighboring cell in which that MBMS session is not ongoing.

The present invention provides an MS that is operating during an MBMS session with a way to determine, based on the MBMS neighboring cell information messages received in the cell currently serving the MS, that its current MBMS session is not active in the neighboring cell to which the MS will reselect. Here, the present invention provides a way for the MS to provide the network with the identity of the neighboring cell and the MBMS session that is active.

In the preferred embodiment of the present invention, in cases where an ongoing transmission has not been established in a neighboring cell to which the MS will select, the network is provided with a way to initiate transmission of an MBMS session. In addition, when an MBMS bearer for the session has not been previously established, the network is provided with the ability to rapidly establish and/or allocate an MBMS bearer for this session in a neighboring cell. This occurs if the network has received sufficient indication from at least one MS in the serving cell that at least one MS is about to move to a specific neighboring cell in which the session is inactive.

In the preferred embodiments of the invention, when the MS determines that its current MBMS session is not in progress within its target cell, the MS informs the network of this by indicating the identity of the target cell and the MBMS session in a RLC/MAC message. In this case, the MBMS channel may be allocated before the mobile station performs a cell reselection. As a result, the time that the MBMS service is unavailable becomes minimized and thus, a reduction of lost data is achieved. This reduced data loss improves service quality and/or reduces network loads caused by point-to-point repairs.

Other objects and features of the present invention will become apparent from the following detailed description considered in conjunction with the accompanying drawings. It is to be understood, however; that the drawings are designed solely for purposes of illustration and not as a definition of the limits of the invention, for which reference should be made to the appended claims. It should be further understood that the drawings are merely intended to conceptually illustrate the structures and procedures described herein.

BRIEF DESCRIPTION OF THE DRAWINGS

The foregoing and other advantages and features of the invention will become more apparent from the detailed description of the preferred embodiment of the invention given below with reference to the accompanying drawings in which.

DETAILED DESCRIPTION OF THE EXEMPLARY EMBODIMENTS

The present invention is a system and method for minimizing the gap in service during the reception of an MBMS session when a current MBMS session is not active in the neighboring cell to which the MS will reselect.

Figure 2:
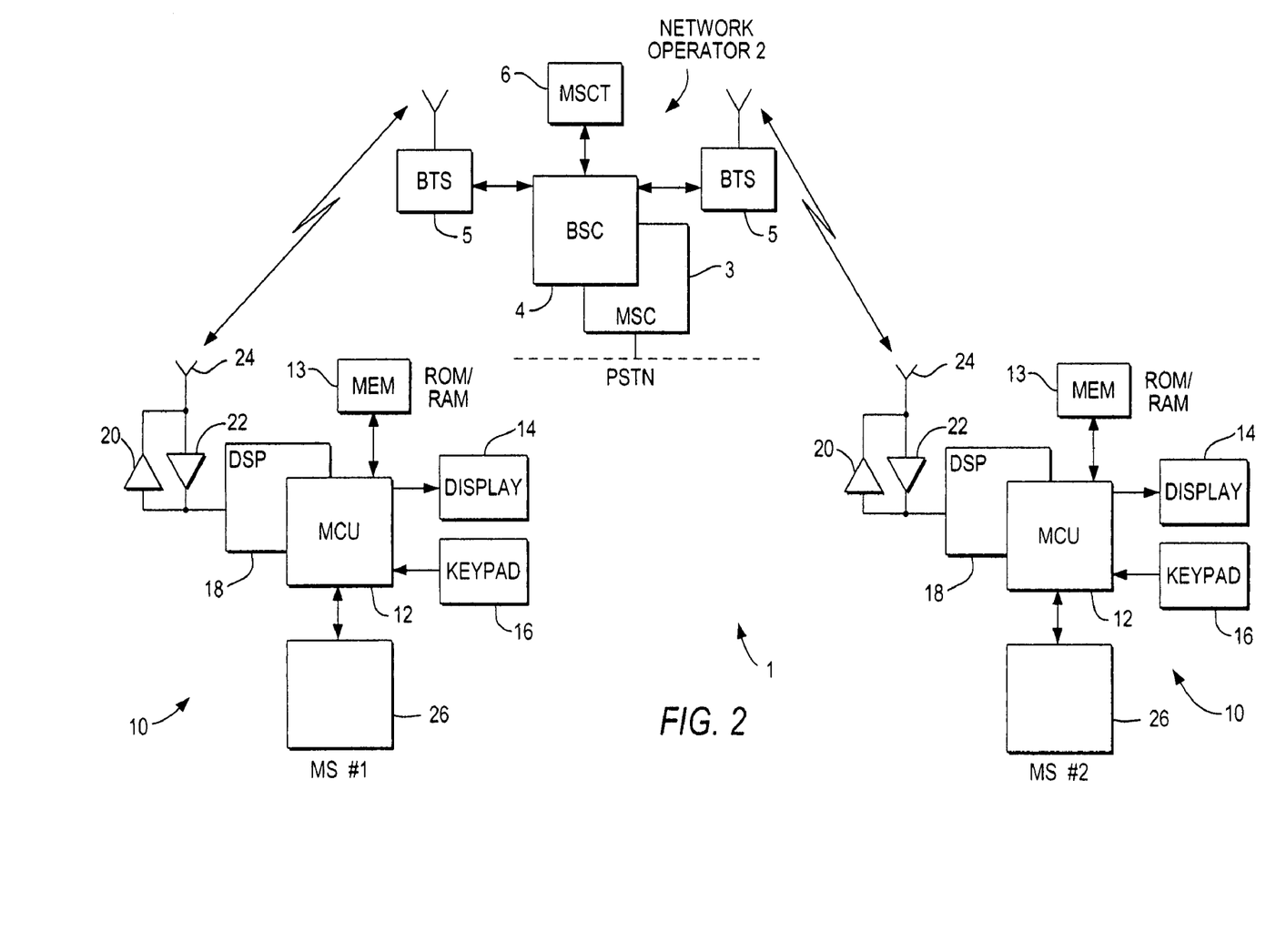
FIG. 2 is an exemplary block diagram of a wireless communication system in which the method of the invention is implemented.

Referring to FIG. 2, shown therein is a simplified block diagram of an embodiment of an exemplary wireless telecommunications system I that includes a plurality of mobile terminals or stations 10. Two mobile stations (MSs) 10 are shown, with one being designated MS#1 and the other MS#2. FIG. 2 also shows an exemplary network operator 2 having, for example, a mobile switching center (MSC) 3 for connecting to a telecommunications network, such as the Public Switched Telephone Network (PSTN), at least one base station controller (BSC) 4, and a plurality of base transceiver stations (BTS) 5 that transmit in a forward or downlink direction both physical and logical channels to the mobile stations 10 in accordance with a predetermined air interface standard. It is assumed that a reverse or uplink communication path exists from the mobile station 10 to the network operator, which conveys mobile originated access requests and traffic, as well as signaling for implementing the invention. The BTSs 5 define cells, which can be different sizes, different frequencies and so forth.

The air interface standard may conform to a Time Division Multiple Access (TDMA) air interface, and the network may be an Universal Mobile Telecommunications System (UMTS) network or other type of network. However, the teachings of the present invention apply equally to Code Division Multiple Access (CDMA) networks, as well as to other network types.

The network operator 2 can include a Message Service Center (MSCT) 6 that receives and forwards messages for the MS 10, such as Short Message Service (SMS) messages, or any wireless messaging technique including e-mail and Supplementary Data Services. Furthermore, enhancements to SMS can be used, such as one under development and known as Multimedia Messaging Service (MMS), wherein image messages, video messages, audio messages, text messages, executables and the like, and combinations thereof, can be transferred between a network and a mobile station.

The mobile station (MS) 10 typically includes a microcontrol unit (MCU) 12 having an output coupled to an input of a display 14 and an input coupled to an output of a keyboard or keypad 16. The MS 10 may be considered to be a handheld radiotelephone, such as a cellular, mobile telephone or a personal communicator, and may have a microphone and a speaker (not shown) for conducting voice communications. The MS 10 could also be contained within a card or module that is connected during use to another device. For example, the MS 10 could be contained within a PCMCIA or similar type of card or module that is installed during use within a portable data processor, such as a laptop or notebook computer, or even a computer that is wearable by the user.

The MCU 12 is assumed to include or be coupled to some type of a memory 13, including a read-only memory (ROM) for storing an operating program, as well as a random access memory (RAM) for temporarily storing required data, scratchpad memory, received data packets and data packets prepared for transmission, etc. The memory 13 is assumed to store the various parameters which are used by the MS 10 for performing cell reselection.

A separate, removable SIM (not shown) can be also be provided, the SIM storing, for example, a preferred Public Land Mobile Network (PLMN) list and other subscriber-related information. The ROM is assumed, for the purposes of this invention, to store a program enabling the MCU 12 to execute the software routines required to operate in accordance with the presently preferred embodiments of the present invention.

The MS 10 also contains a wireless section that includes a digital signal processor (DSP) 18, or equivalent high speed processor, as well as a wireless transceiver comprised of a transmitter 20 and a receiver 22, both of which are coupled to an antenna 24 for communication with the network operator 2. The receiver 22 is used for making signal measurements used in the cell reselection process.

In accordance with the invention, all broadcast control channel (BCCH) carriers indicated in a BCCH allocation are monitored by a mobile station (MS) 10, while the MS is in a packet idle mode and during which the identity of an MBMS bearer (p-t-m) is received. A list of the cells with non-serving BCCH carriers having the highest signaling levels is updated at least as often as a predefined duration of the running average that is defined for measurements of the BCCH carrier allocation. Here, an assumption is made that the MS is operating in a new mode. In addition, as defined in the 3GPP TS 45.008 V6.9.0 (2004-08) TS "Radio Access Network; Radio subsystem link control (Release 6), the MS attempts to decode a BCCH data block containing parameters that affect cell reselection for each of the non-serving cell BCCH carriers having the highest signal levels.

The MS 10 indicates the base transceiver station identity codes (BSICs) and neighboring cell indexes of BCCH carriers by adding them to an uplink radio link control/medium access control (RLC/MAC) message, e.g., a packet downlink acknowledge/nonacknowledge (ACK/NACK) or with a new message, which is transmitted to the network. As a result, the network is provided with the identity of which cell the MS 10 is most likely to reselect to upon reception of the uplink RLC/MAC message carrying the BSICs and neighboring cell indexes of the neighboring non-serving BCCH carriers of the MS.

In an embodiment of the invention, while the MS 10 is monitoring an MBMS session in its current serving cell, it is possible to assume that the MBMS session is not activated in the target cell, based on the received neighboring MBMS cell information. In accordance with the present embodiment of the invention, when reselection is triggered, the MS 10 indicates its target cell and MBMS service ID (i.e., BSIC, neighboring cell index, and Temporary MBMS Group Identity (TMGI)) by sending this information to the network in an RLC/MAC message, e.g., a packet downlink ACK/NACK or with a new message. If the network has resources available for allocation, the network is permitted to allocate these resources for the MBMS session indicated by the MS and send corresponding MBMS neighbor cell information to the MS 10 upon receipt of the packet downlink ACK/NACK or the new message. Upon receipt of the MBMS neighbor cell information by the MS 10, it will then reselect to the target cell identified in the MBMS neighbor cell information.

The MS 10 is preferably permitted to violate cell reselection rules by delaying cell reselection until it has received MBMS neighbor cell information from the network, indicating that there are allocated MBMS resources in the target cell. As a result, a way is needed to prevent the MS 10 from remaining too long in the source cell. This is accomplished by utilizing a new timer. This timer is started when the cell reselection criteria are triggered in the MS. Upon receipt of the appropriate MBMS neighbor cell information, the mobile station performs cell reselection and continues normal reception of MBMS data in the target cell. If a predetermined time period that is monitored expires before the appropriate MBMS neighbor cell information is received, then the MS 10 is permitted to perform normal cell reselection to common channels of the target cell, as specified in 3GPP TS 44.060, "Radio Link Control/Medium Access Control (RLC/MAC) protocol; Stage 3" and 3GPP TS 44.018, "Radio Resource Control (RRC) protocol; Stage 3".

In an alternative embodiment, the MS is prevented from remaining too long in the source cell by the use of a predefined parameter. For example, if the appropriate MBMS neighbor cell information remains unreceived, but the predefined parameter has a negative value, or a "better" cell appears to have a signaling level that is greater than a fixed decibel level, then the mobile station will perform a normal cell reselection. In the preferred embodiment, the predefined parameter is C1, i.e., a path loss criterion.

In an additional embodiment for preventing the MS 10 from remaining too long in a source cell, reselection hysteresis is used to ensure that an immediate cell reselection occurs if the best reselection candidate gets "much better than the serving cell," i.e., the signaling level of the BCCH carrier of the neighboring cell is much greater than the signaling level of the BCCH carrier of the source cell. Reselection hysteresis is achieved by adding an off-set value to the measured signaling strength of the BCCH carrier of the current cell. The measurement result of the BCCH carrier of the neighboring cell must exceed the sum of the measured signaling level of the neighboring cell and the off-set value before a cell reselection can occur. This introduces some additional reselection delay. As a result, a moderate increase in the level of inter-channel interference occurs. This is due in part to the MS 10 periodically sending acknowledgments and operating somewhat outside the planned coverage area of the serving cell. In other embodiments of the invention, such additional interference is considered marginal. However, it is possible to avoid generating this interference if the MS 10 stops sending acknowledgements for a period of time that is measured from when the reselection criteria is first triggered and the network is informed of the triggering of the reselection criteria to when the network has provided neighbor cell information for the reselection target cell and/or to when the MS 10 has actually reselected the target cell. In addition, the network may send additional repetitions of broadcasted MBMS neighbor cell information during the above-mentioned period to take into account that this particular MS 10 is still receiving MBMS data from the source cell but not sending ACKS. In accordance with the present embodiment, either the maximum number of repetitions may be sent or the network may estimate a sufficient number of repetitions based on the most recent prior ACKS from a particular MS.

Figure 3:
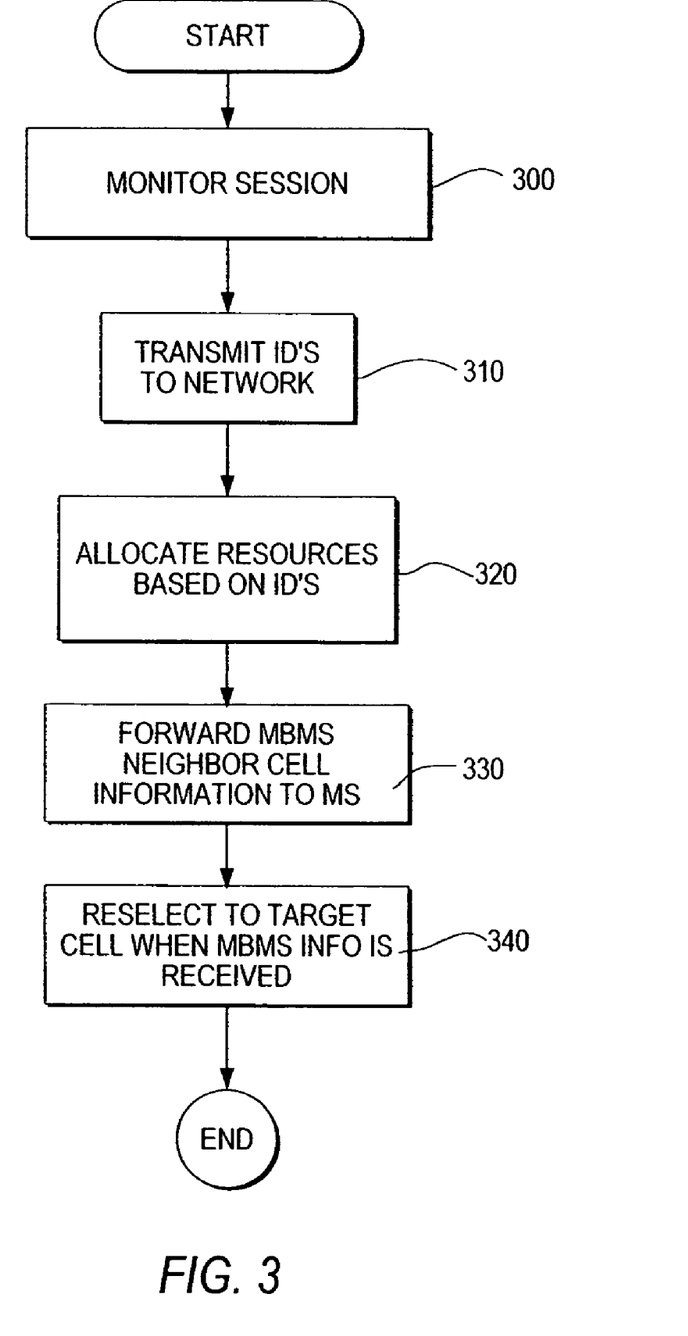
FIG. 3 is a flow chart illustrating the steps of the method in accordance with an embodiment of the present invention.

FIG. 3 is a flow chart illustrating the steps of the method in accordance with the present invention. An MBMS session in a cell in which the MBMS session is active is monitored, as indicated in step 300. Here, all broadcast control channel (BCCH) carriers indicated in a BCCH allocation are monitored by a mobile station (MS), while the MS is in a packet idle mode and during which the identity of a MBMS bearer (p-t-m) is received.

After the reselection criteria have triggered, the MS 10 indicates its target cell and MBMS service id (i.e., BSIC, neighboring cell index, and Temporary MBMS Group Identity (TMGI)) by sending this information to the network in an RLC/MAC message, e.g., a packet downlink ACK/NACK or with a new message, as indicted in step 310. The network then allocates resources for an MBMS session indicated by the MS if the network has resources available for allocation to the MS, as indicated in step 320.

Next, corresponding MBMS neighbor cell information is sent to the MS upon receipt of the packet downlink ACK/NACK or a new message, as indicated in step 330. The MS then reselects to the target cell upon receipt of the MBMS neighbor cell information, as indicated in step 340.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method comprising:

monitoring, by a wireless terminal, a multimedia broadcast/multicast service session in a current cell in which the multimedia broadcast/multicast service session is active, wherein the wireless terminal is receiving the multimedia broadcast/multicast service session in the current cell and prior to a reselection of the wireless terminal within a network from the current cell to a target cell in which the multimedia broadcast/multicast service session is not currently active;

transmitting, via the current cell, a target cell identification and a multimedia broadcast/multicast service identification in a message from the wireless terminal to the network; and in response to receiving multimedia broadcast/multicast service target cell information from the network via the current cell, reselecting the wireless terminal to the target cell and continuing wireless terminal reception of the multimedia broadcast/multicast service session in the target cell.

2. The method of claim 1, wherein the, target cell identification comprises a base transceiver identity code neighboring cell index.

3. The method of claim 1, wherein the multimedia broadcast/multicast service identification comprises a temporary multimedia broadcast/multicast service group identity or a temporary multimedia broadcast/multicast service group identity and a multimedia broadcast/multicast service session identity.

4. The method of claim 1, wherein the multimedia broadcast/multicast service identification uniquely identifies a temporary multimedia broadcast/multicast service group identity or a temporary multimedia broadcast/multicast service group identity and a multimedia broadcast/multicast service session identity.

5. The method of claim 1, wherein the message comprises a packet downlink acknowledgement/non-acknowledgement message for indicating an acknowledgement status for radio link control data blocks belonging to the monitored multimedia broadcast/multicast service session.

6. The method of claim 1, wherein the message comprises a new radio link control/medium access control message for indicating an acknowledgement status for data blocks belonging to the monitored multimedia broadcast/multicast service session.

7. The method of claim 1, wherein the wireless terminal delays cell reselection until the multimedia broadcast/multicast service target cell information has been received from the network.

8. The method of claim 7, wherein a predefined parameter is set to prevent the wireless terminal from remaining too long in the current cell.

9. The method of claim 8, wherein if the multimedia broadcast/multicast service target cell information remains unreceived and the predefined parameter has a negative value, the wireless terminal performs a normal cell reselection.

10. The method of claim 9, wherein the predefined parameter is C1.

11. The method of claim 8, wherein if the multimedia broadcast/multicast service target cell information remains unreceived and another cell has a signaling level that is greater than a fixed decibel level, the wireless terminal performs a normal cell reselection.

12. The method of claim 11, wherein the predefined parameter is C1.

13. The method of claim 8, wherein the predefined parameter is C1.

14. The method of claim 13, wherein C1 is a path loss criterion.

15. The method of claim 7, wherein reselection hysteresis is used to ensure that an immediate cell reselection occurs if a signaling level of a broadcast control channel carrier of the target cell is much greater than a signaling level of a broadcast control channel carrier of the current cell.

16. The method of claim 15, wherein an off-set value is added to a measured signaling strength of the broadcast control channel carrier of the current cell to achieve re-selection hysteresis.

17. The method of claim 1, wherein the message comprises a radio link control/medium access control message.

18. The method of claim 1, wherein a gap in service for the multimedia broadcast/multicast service session of the wireless terminal due to cell reselection is minimized.

19. A computer-readable medium storing a computer program, execution of the computer program by a processor of a wireless terminal resulting in operations, said operations comprising:

monitoring a multimedia broadcast/multicast service session in a current cell in which the multimedia broadcast/multicast service session is active, wherein the wireless terminal is receiving the multimedia broadcast/multicast service session;

in the current cell and prior to a reselection of the wireless terminal within a network from the current cell to a target cell in which the multimedia broadcast/multicast service session is not currently active;

transmitting, via the current cell, a target cell identification and a multimedia broadcast/multicast service identification in a message from the wireless terminal to the network; and in response to receiving multimedia broadcast/multicast service target cell information from the network via the current cell, reselecting the wireless terminal to the target cell and continuing wireless terminal reception of the multimedia broadcast/multicast service session in the target cell.

20. The computer-readable medium of claim 19, wherein the target cell identification comprises a base transceiver identity code neighboring cell index.

21. The computer-readable medium of claim 19, wherein the multimedia broadcast/multicast service identification comprises a Temporary multimedia broadcast/multicast service Group Identity or a temporary multimedia broadcast/multicast service group identity and a multimedia broadcast/multicast service session identity.

22. The computer-readable medium of claim 19, wherein the message comprises a radio link control/medium access control message.

23. The computer-readable medium of claim 22, wherein the radio link control/medium access control message comprises a packet downlink acknowledgement/non-acknowledgement message.

24. The computer-readable medium of claim 19, wherein a predefined parameter is set to prevent the wireless terminal from remaining too long in the current cell.

25. An apparatus comprising:

a processor configured:

to monitor a multimedia broadcast/multicast service session in a current cell in which the multimedia broadcast/multicast service session is active, wherein a wireless terminal is receiving the multimedia broadcast/multicast service session, in the current cell and prior to a reselection of the wireless terminal within a network from the current cell to a target cell in which the multimedia broadcast/multicast service session is not currently active; and to send, via the current cell, a target cell identification and a multimedia broadcast/multicast service identification in a message to the network;

to receive, via the current cell, multimedia broadcast/multicast service target cell information from the network; and in response to receiving the multimedia broadcast/multicast service target cell information from the network via the current cell, to reselect to the target cell and to continue wireless terminal reception of the multimedia broadcast/multicast service session in the target cell.

26. The apparatus of claim 25, wherein the target cell identification comprises a base transceiver identity code neighboring cell index.

27. The apparatus of claim 25, wherein the multimedia broadcast/multicast service identification comprises a temporary multimedia broadcast/multicast service group identity or a temporary multimedia broadcast/multicast service group identity and a multimedia broadcast/multicast service session identity.

28. The apparatus of claim 25, wherein the message comprises a radio link control/medium access control message.

29. The apparatus of claim 28, wherein the radio link control/medium access control message comprises a packet downlink acknowledgement/non-acknowledgement message.

30. The apparatus of claim 25, wherein the wireless terminal comprises a mobile station or a mobile phone.

31. The method of claim 30, wherein the neighbor cell identification comprises a base transceiver identity code neighboring cell index.

32. The method of claim 30, wherein a predefined parameter is set to prevent the wireless terminal from remaining too long in the current cell.

33. The apparatus of claim 25, wherein a predefined parameter is set to prevent the wireless terminal from remaining too long in the current cell.

34. A method comprising:
monitoring, by a mobile station, a multimedia broadcast/multicast service session in a current cell in which the multimedia broadcast/multicast service session is active, wherein the mobile station is receiving the multimedia broadcast/multicast service session in the current cell and prior to a reselection of the wireless terminal within a network from the current cell to a neighbor cell in which the multimedia broadcast/multicast service session is not currently active;

transmitting, via the current cell, a neighbor cell identification and a multimedia broadcast/multicast service identification in a radio link control/medium access control message from the mobile station to the network;

receiving multimedia broadcast/multicast service neighbor cell information from the network via the current cell; and in response to receiving the multimedia broadcast/multicast service neighbor cell information from the network via the current cell, reselecting the wireless terminal to the neighbor cell and continuing mobile station reception of the multimedia broadcast/multicast service session in the neighbor cell.

35. A method comprising:
receiving, by a network controller via a current cell, a message from a wireless terminal, the message comprising a target cell identification and a multimedia broadcast/multicast service identification for a multimedia broadcast/multicast service session of the wireless terminal, wherein the multimedia broadcast/multicast service session is currently not active in the target cell;

allocating resources for the multimedia broadcast/multicast service session of the wireless terminal in the target cell; and transmitting multimedia broadcast/multicast service target cell information to the wireless terminal from the network via the current cell.

36. The method of claim 35, wherein the target cell identification comprises a base transceiver identity code neighboring cell index.

37. The method of claim 35, wherein the multimedia broadcast/multicast service identification comprises a temporary multimedia broadcast/multicast service group identity or a temporary multimedia broadcast/multicast service group identity and a multimedia broadcast/multicast service session identity.

38. The method of claim 35, wherein the message comprises a radio link control/medium access control message.

39. The method of claim 38, wherein the radio link control/medium access control message comprises a packet downlink acknowledgement/non-acknowledgement message.

40. A computer-readable medium tangibly storing a computer program, execution of the computer program by a processor resulting in operations, said operations comprising:
receiving, by a network controller via a current cell, a message from a wireless terminal, the message comprising a target cell identification and a multimedia broadcast/multicast service identification for a multimedia broadcast/multicast service session of the wireless terminal, wherein the multimedia broadcast/multicast service session is currently not active in the target cell;

allocating resources for the multimedia broadcast/multicast service session of the wireless terminal in the target cell; and transmitting multimedia broadcast/multicast service target cell information to the wireless terminal from the network via the current cell.

41. The computer-readable medium of claim 40, wherein the target cell identification comprises a base transceiver identity code neighboring cell index.

42. The computer-readable medium of claim 40, wherein the multimedia broadcast/multicast service identification comprises a temporary multimedia broadcast/multicast service group identity or a temporary multimedia broadcast/multicast service group identity and a multimedia broadcast/multicast service session identity.

43. The computer-readable medium of claim 40, wherein the message comprises a radio link control/medium access control message.

44. The computer-readable medium of claim 43, wherein the radio link control/medium access control message comprises a packet downlink acknowledgement/non-acknowledgement message.

45. An apparatus comprising a processor configured:
to receive a message from a wireless terminal via a current cell, the message comprising a target cell identification and a multimedia broadcast/multicast service identification for a multimedia broadcast/multicast service session of the wireless terminal, wherein the multimedia broadcast/multicast service session is currently not active in the target cell;

to allocate resources for the multimedia broadcast/multicast service session of the wireless terminal in the target cell, to send multimedia broadcast/multicast service target cell information to the wireless terminal via the current cell.

46. The network controller apparatus of claim 45, wherein the target cell identification comprises a base transceiver identity code neighboring cell index.

47. The apparatus of claim 45, wherein the multimedia broadcast/multicast service identification comprises a temporary multimedia broadcast/multicast service group identity or a temporary multimedia broadcast/multicast service group identity and a multimedia broadcast/multicast service session identity.

48. The network controller apparatus of claim 45, wherein the message comprises a radio link control/medium access control message.

49. The network controller apparatus of claim 45, wherein the radio link control/medium access control message comprises a packet downlink acknowledgement/non-acknowledgement message.

50. The network controller apparatus of claim 45, wherein the apparatus is embodied in a base transceiver station.

* * * * *